United States Patent
Kaneko

(10) Patent No.: US 6,678,044 B2
(45) Date of Patent: Jan. 13, 2004

(54) MONOCHROMATOR AND OPTICAL SPECTRUM ANALYZER EQUIPPED WITH THE SAME

(75) Inventor: Tsutomu Kaneko, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 68 days.

(21) Appl. No.: 09/907,032

(22) Filed: Jul. 17, 2001

(65) Prior Publication Data

US 2002/0008873 A1 Jan. 24, 2002

(30) Foreign Application Priority Data

Jul. 17, 2000 (JP) .................................... P. 2000-216241

(51) Int. Cl.[7] ................................ G01J 3/18; G01J 3/12
(52) U.S. Cl. ........................ 356/334; 356/331; 356/332
(58) Field of Search ................................ 359/566, 569, 359/572; 356/334, 332, 331, 300

(56) References Cited

U.S. PATENT DOCUMENTS 5,192,981 A * 3/1993 Slutter et al. ............... 356/334
5,521,995 A * 5/1996 Brazas ....................... 356/482
6,134,039 A * 10/2000 Rudeen ...................... 359/196

* cited by examiner

Primary Examiner—Audrey Chang
Assistant Examiner—Denise S. Allen
(74) Attorney, Agent, or Firm—Fish & Richardson P.C.

(57) ABSTRACT

Plane diffraction grating 13 is formed of a material having an appropriate linear expansion coefficient and a variation in the wavelength of the reflected light from concave mirror 14 on account of thermal expansion or shrinkage of members other than plane diffraction grating 13 is cancelled out or reduced by a variation in the wavelength of the reflected light from concave mirror 14 on account of thermal expansion or shrinkage of plane diffraction grating 13. The same principle is used to deal with the effect on the wavelength of the diffracted light that may be caused by changes in the layout of individual members on account of thermal expansion or shrinkage of substrate 10a that fix them.

8 Claims, 3 Drawing Sheets

MONOCHROMATOR AND OPTICAL SPECTRUM ANALYZER EQUIPPED WITH THE SAME

BACKGROUND OF THE INVENTION

1. Field of the Invention

The present invention relates to a monochromator capable of picking up light of a desired wavelength in high precision without being influenced by changes in ambient temperature. The invention also relates to an optical spectrum analyzer equipped with the monochromator.

2. Description of the Related Art

FIG. 3 shows an example of the conventional optical spectrum analyzer. The optical spectrum analyzer generally indicated at 100 comprises a monochromator 110 of the Czerny-Turner dispersion type, an analysis and control section 120 which not only controls the monochromator 110 but also analyzes the result of spectroscopy with the monochromator 110, and a display section 130 for displaying the result of measurement.

The monochromator 110 basically comprises an entrance slit 111 through which the incident light is passed from a light source 200, a concave mirror 112 by which the light passing through the entrance slit 111 is converted to parallel light and reflected, a plane diffraction grating 113 for diffracting the parallel light from the concave mirror 112, a concave mirror 114 for reflecting and condensing part of the diffracted light from the plane diffraction grating 113, an exit slit 115 through which the reflected light from the concave mirror 114 passes to emerge, and a photo detector 116 which measures the intensity of the emerging light from the exit slit 115 and which outputs it to the analysis and control section 120.

Thus, the monochromator 110 condenses that part of the diffracted light from the plane diffraction grating 113 which is directed toward the concave mirror 114 and then measures the intensity of that light.

The plane diffraction grating 113 is driven to rotate by a motor 113a so that it alters the wavelength of the light being diffracted toward the concave mirror 114. The motor 113a is controlled by the analysis and control section 120. Thus, the analysis and control section 120 controls the angle of the plane diffraction grating 113 via the motor 113a, thereby controlling the wavelength of the light being received by the photo detector 116. In other words, the analysis and control section 120 measures the intensity of light of a specified wavelength by setting the angle of the plane diffraction grating 113 to a specified value.

All members of the monochromator 110 including the substrate will expand and shrink thermally. Hence, the position of the concave mirror 114 relative to the plane diffraction grating 113 changes subtly with the ambient temperature and there has been the potential for the failure to separate light of a specified wavelength even if the angle of the plane diffraction grating 113 is set to a specified value.

SUMMARY OF THE INVENTION

An object, therefore, of the present invention is to ensure that light of a specified wavelength is separated in high precision despite changes in the ambient temperature.

To achieve the above object of the invention, there is provided a monochromator (10) comprising a diffraction grating (e.g. plane diffraction grating 13) for diffracting incident light and a selection means (e.g. concave mirror 14) for selecting light of a desired wavelength from the light diffracted by said diffraction grating, characterized in that said diffraction grating is formed of a material selected such that a variation in the wavelength of the selected light that occurs under the same selection conditions on account of thermal expansion or shrinkage of members other than said diffraction grating is cancelled out or reduced by a variation in the wavelength of the selected light that occurs under the same selection conditions on account of thermal expansion or shrinkage of said diffraction grating.

The diffraction grating also expands and shrinks thermally as temperature changes. Upon expansion or shrinking, the grating constant of the diffraction grating changes and so does the diffraction angle of light of the same wavelength. Hence, thermal expansion or shrinkage of the diffraction grating causes variations in the light selected by the selection means. The amount or direction of such variations can be adjusted by altering the constituent material of the diffraction grating.

Hence, by choosing an appropriate constituent material for the diffraction grating a variation in the wavelength of the selected light that occurs under the same selection conditions on account of thermal expansion or shrinkage of members other than the diffraction grating can be cancelled out or reduced by a variation in the wavelength of the selected light that occurs under the same selection conditions on account of thermal expansion or shrinkage of the diffraction grating. As a result, there is provided a monochromator that can separate light of a specified wavelength in high precision despite changes in ambient temperature.

According to the present invention, there is provided a monochromator (10) comprising a diffraction grating (e.g. plane diffraction grating 13) for diffracting incident light and a selection means (e.g. concave mirror 14) for selecting light of a desired wavelength from the light diffracted by said diffraction grating, characterized in that said diffraction grating is formed of a material selected such that a variation in the wavelength of the selected light that occurs under the same selection conditions on account of a change in the layout of individual members due to thermal expansion or shrinkage of the substrate for fixing the individual members is cancelled out or reduced by a variation in the wavelength of the selected light that occurs under the same selection conditions on account of thermal expansion or shrinkage of said diffraction grating.

According to invention, there is provided a monochromator that relies upon the same principle to separate light of a specified wavelength in high precision despite changes in ambient temperature.

The monochromator may be of the Czerny-Turner dispersion type. The constituent material of the diffraction grating may be PYREX™-brand borosilicate glass.

According to the present invention, there is provided an optical spectrum analyzer (1) equipped with the monochromator above mentioned.

According to the invention, light of a specified wavelength is separated and its intensity measured in high precision irrespective of changes in ambient temperature.

DESCRIPTION OF THE PRESENT INVENTION

Modes for carrying out the invention are described below in detail with reference to FIGS. 1 and 2.

We first describe the structural features of the invention.

Figure 1:
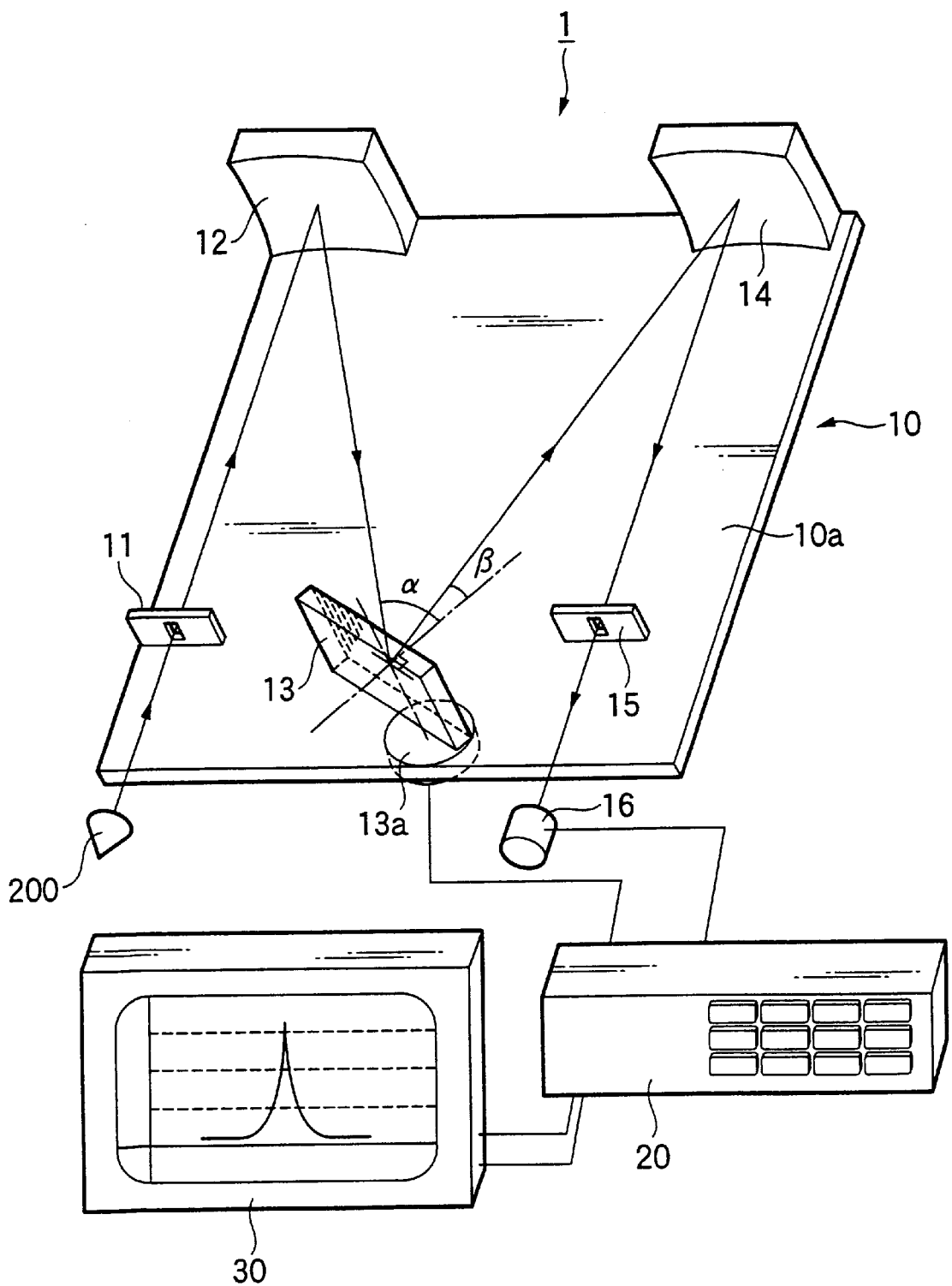
FIG. 1 is a perspective view showing schematically the construction of an optical spectrum analyzer according to an embodiment of the invention.
Figure 2:
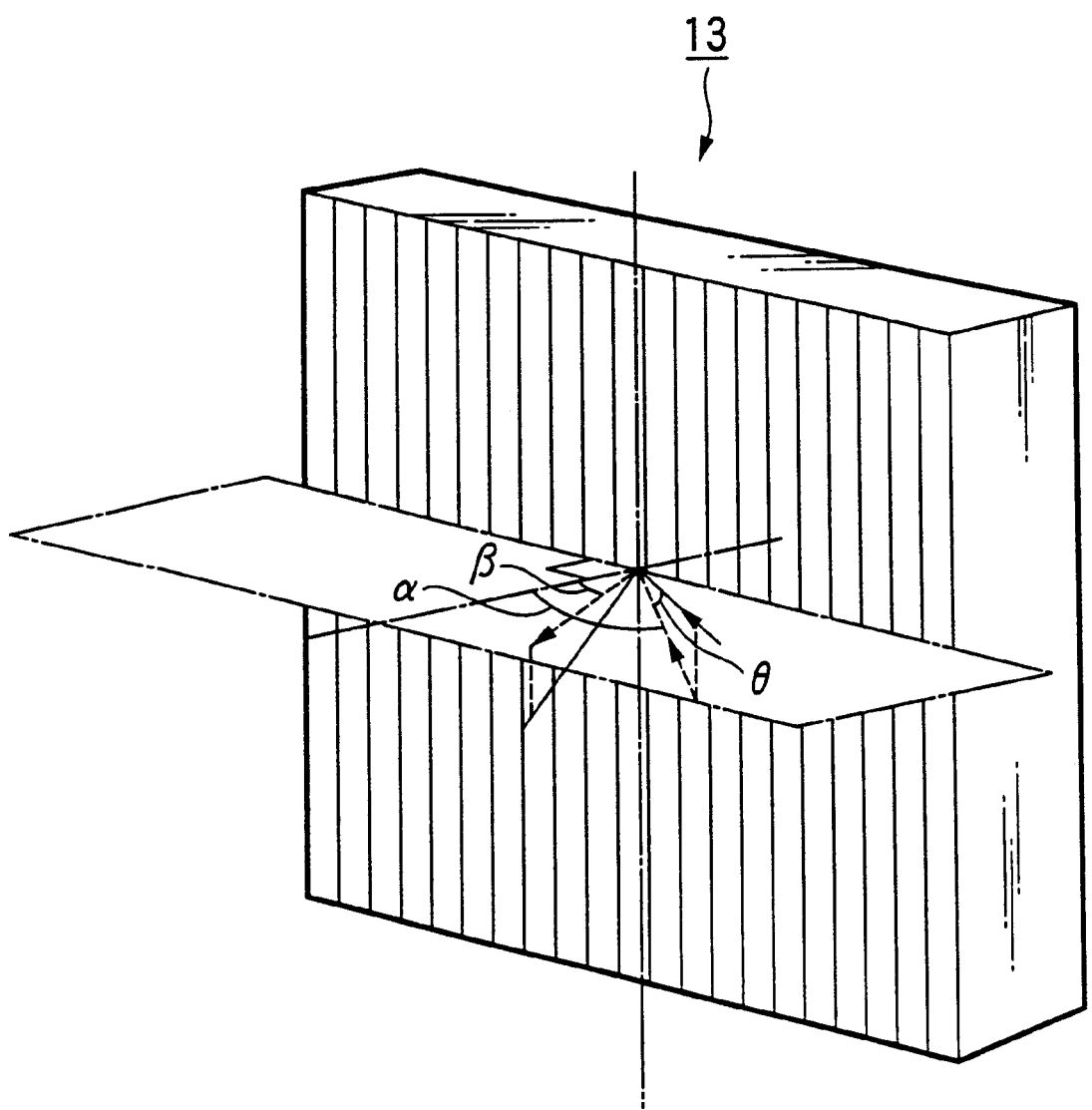
FIG. 2 is a perspective view showing the construction of a plane diffraction grating used in the monochromator shown in FIG. 1.
Figure 3:
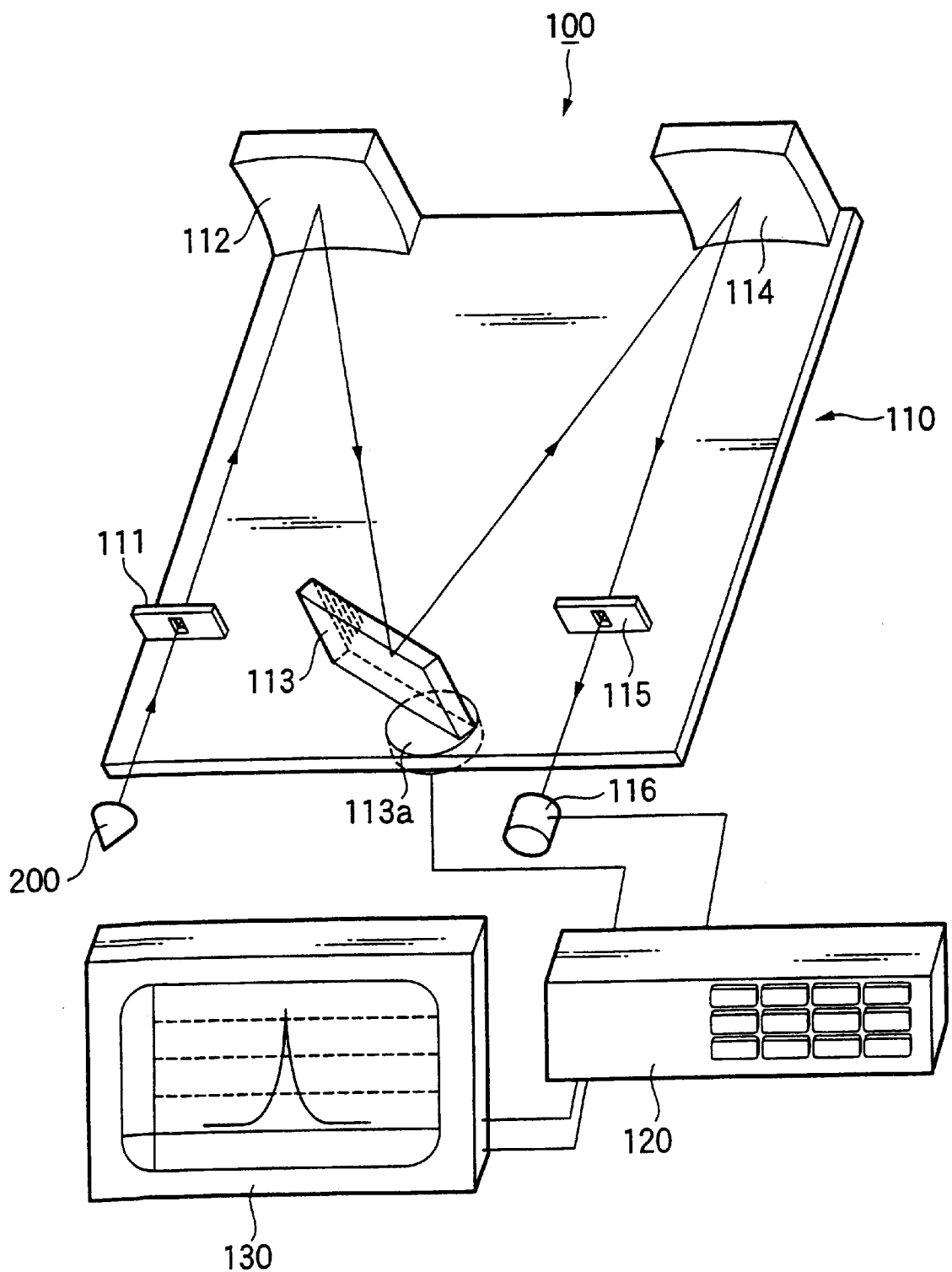
FIG. 3 is a perspective view showing schematically the construction of a conventional optical spectrum analyzer.

As FIG. 1 shows, an optical spectrum analyzer 1 comprises a monochromator 10 of the Czerny-Turner dispersion type, an analysis and control section 20 which not only controls the monochromator 10 but also analyzes the result of spectroscopy with the monochromator 10, and a display section 30 for displaying the result of measurement. The analysis and control section 20 has generally the same structure as the analysis and control section 120, and the display section 30 has generally the same structure as the display section 130.

The monochromator 10 basically comprises an entrance slit 11 through which to pass the incident light from a light source 200, a concave mirror 12 by which the light passing through the entrance slit 11 is converted to parallel light and reflected, a plane diffraction grating 13 for diffracting the parallel light from the concave mirror 12, a motor 13a for rotating the plane diffraction grating 13, a concave mirror 14 for reflecting and condensing part of the diffracted light from the plane diffraction grating 13, an exit slit 15 through which the reflected light from the concave mirror 14 passes to emerge, and a photo detector 16 which measures the intensity of the emerging light from the exit slit 15 and which outputs it to the analysis and control section 20. All members except the plane diffraction grating 13 have the same structures as their counterparts in the conventional monochromator 110. All of the members mentioned above are fixed on the substrate 10a.

The plane diffraction grating 13 has generally the same shape as the plane. diffraction grating 113 but its constituent material should be chosen in accordance with the criterion set forth below. Specific examples include PYREX™-brand borosilicate glass and BK7 which is a kind of borosilicate crown glass.

In the monochromator 10, the wavelength λ of light emerging from the exit slit 15 is expressed by the following equation:

$$\lambda = (d/m) \times \cos\theta \times (\sin\alpha + \sin\beta) \quad (1)$$

where m is the diffraction order, d is the grating constant, θ is the angle the incident light forms with the depth direction of a groove, α is the angle at which the incident light falls on the diffraction grating, and β is the angle of emergence of light from the diffraction grating. Angles θ, α and β are depicted in FIG. 2.

If k is written for the linear expansion coefficient of the constituent material of the plane diffraction grating 13, Δd or the change in d for 1° C. is equal to k.

Therefore, if the other conditions are the same, Δλ or the change in λ for 1° C. is expressed by the following equation:

$$\Delta\lambda = (k/m) \times (\sin\alpha + \sin\beta) \quad (2)$$

The substrate 10a is in most cases made of aluminum and undergoes thermal expansion or shrinkage as the ambient temperature changes. The relative positions of the plane diffraction grating 13 and the concave mirror 14 vary with the ambient temperature to cause variations in λ. In most cases, the fastening members for fixing the individual members of the monochromator 10 to the substrate 10a are also made of metal, so they expand or shrink thermally; as a result, λ will vary with the ambient temperature.

According to the invention, the constituent material of the plane diffraction grating 13 is chosen such that Δλ expressed by Equation 2 cancels out a measured or estimated value of λ variation due to thermal expansion or shrinkage of other components and the substrate 10a.

Further details are given for the two specific examples of the constituent material of the plane diffraction grating 13. PYREX™-brand borosilicate glass has a k value of $3.25 \times 10^{-6}$ and BK7 has a k value of $7.1 \times 10^{-6}$.

If θ=0° and the angle the optical axis of the reflected light from the concave mirror 12 forms with the optical axis of the light diffracted by the plane diffraction grating 13 is 20°, α and β for light having a wavelength (λ) of 1,550 nm are 69.957° and 49.957°, respectively.

If the plane diffraction grating 13 has 1,100 grooves per millimeter, Δλ in the case of m=1 is $5.03 \times 10^{-12}$ m/° C. for PYREX™-brand borosilicate glass and $11 \times 10^{-12}$ m/° C. for BK7.

Therefore, if thermal expansion or shrinkage of the substrate 10a and other components causes Δλ of $-10 \times 10^{-12}$ m/° C., the plane diffraction grating 13 may be formed of BK7 and the net Δλ decreases to $1 \times 10^{-12}$ m/° C.

If thermal expansion or shrinkage of the substrate 10a and other components causes Δλ of $-5 \times 10^{-12}$ m/° C., the plane diffraction grating 13 may be formed of PYREX™-brand borosilicate glass and the net Δλ is almost zero which is smaller than the value realized by using BK7.

If the constituent material of the plane diffraction grating 13 is chosen to satisfy the criterion set forth in the foregoing embodiment, the wavelength measurement with the monochromator 10 is less error-prone despite changes in ambient temperature. As a result, the wavelength measurement with the optical spectrum analyzer 1 is also less error-prone despite changes in ambient temperature.

In the foregoing embodiment, PYREX™-brand borosilicate glass and BK7 are given as examples of the constituent material of the plane diffraction grating 13 but the invention is by no means limited to these and the constituent material may be chosen from an increased number of candidates to ensure that the net value of Δλ is reduced adequately irrespective of the magnitude of Δλ that is caused by thermal expansion or shrinkage of the substrate 10a or other components of the monochromator 10.

Needless to say, various modifications can also be made with respect to the constituent material of members other than the plane diffraction grating 13 and they include, for example, providing the entrance slit 11 at the output end of an optical fiber or replacing the concave mirrors 12 and 14 by collimator lenses.

According to the invention, a variation in the wavelength of the selected light that occurs under the same selection conditions on account of thermal expansion or shrinkage of members other than the diffraction grating is cancelled out or reduced by a variation in the wavelength of the selected light that occurs under the same selection conditions on account of thermal expansion or shrinkage of the diffraction grating; hence, light of a specified wavelength can be separated in high precision despite changes in ambient temperature.

According to the invention, light of a specified wavelength can be separated in high precision despite changes in the layout of individual components due to changes in ambient temperature.

According to the invention, there is provided an optical spectrum analyzer by which light of a specified wavelength can be separated and its intensity measured in high precision irrespective of changes in ambient temperature.

What is claimed is:

1. A monochromator comprising:
   a diffraction grating for diffracting incident light;
   a selection unit for selecting a desired wavelength of the light diffracted by the diffraction grating; and
   a substrate that fixes the diffraction grating and the selection unit;
   wherein the diffraction grating is made of a material selected such that a variation in the wavelength of the selected light due to thermal expansion or shrinkage of members other than the diffraction grating is cancelled out or reduced by a variation in the wavelength of the selected light due to thermal expansion or shrinkage of the diffraction grating; and
   the diffraction grating is made of a material selected such that a variation in the wavelength of the selected light due to a change in layout of individual members due to thermal expansion or shrinkage of the substrate is cancelled out or reduced by a variation in the wavelength of the selected light due to thermal expansion or shrinkage of the diffraction grating.

2. The monochromator as claimed in claim 1, which is of the Czerny-Turner dispersion type.

3. The monochromator as claimed in claim 1, wherein the diffraction grating is made of borosilicate glass.

4. The monochromator as claimed in claim 1, wherein the selection unit is a slit.

5. An optical spectrum analyzer comprising a monochromator that includes:
   a diffraction grating for diffracting incident light; and
   a selection unit for selecting a desired wavelength of the light diffracted by the diffraction grating,
   wherein the diffraction grating is made of a material selected such that a variation in the wavelength of the selected light due to thermal expansion or shrinkage of members other than the diffraction grating is cancelled out or reduced by a variation in the wavelength of the selected light due to thermal expansion or shrinkage of the diffraction grating.

6. The optical spectrum analyzer as claimed in claim 5, wherein the monochromator further comprises a substrate that fixes the diffraction grating and the selection unit;
   wherein the diffraction grating is made of a material selected such that a variation in the wavelength of the selected light due to a change in layout of individual members due to thermal expansion or shrinkage of the substrate is cancelled out or reduced by a variation in the wavelength of the selected light due to thermal expansion or shrinkage of the diffraction grating.

7. The optical spectrum analyzer as claimed in claim 5, wherein the monochromator is of the Czerny-Turner dispersion type.

8. The optical spectrum analyzer as claimed in claim 5, wherein the diffraction grating in the monochromator is made of borosilicate glass.

* * * * *